US012367808B2

(12) United States Patent
Eom et al.

(10) Patent No.: US 12,367,808 B2
(45) Date of Patent: Jul. 22, 2025

(54) DISPLAY DEVICE AND METHOD OF COMPENSATING FOR AN IMAGE OF THE DISPLAY DEVICE

(71) Applicant: Samsung Display Co., LTD., Yongin-si (KR)

(72) Inventors: Jiyoung Eom, Yongin-si (KR); Moonju Kim, Osan-si (KR); Yong-Ju Jeong, Seoul (KR); Seonghwan Choi, Suwon-si (KR)

(73) Assignee: SAMSUNG DISPLAY CO., LTD., Gyeonggi-do (KR)

(*) Notice: Subject to any disclaimer, the term of this patent is extended or adjusted under 35 U.S.C. 154(b) by 0 days.

(21) Appl. No.: 18/134,300

(22) Filed: Apr. 13, 2023

(65) Prior Publication Data

US 2024/0029631 A1 Jan. 25, 2024

(30) Foreign Application Priority Data

Jul. 25, 2022 (KR) ........................ 10-2022-0091515

(51) Int. Cl.
*G09G 3/32* (2016.01)

(52) U.S. Cl.
CPC ....... *G09G 3/32* (2013.01); *G09G 2300/0828* (2013.01); *G09G 2310/0275* (2013.01); *G09G 2310/0289* (2013.01); *G09G 2310/08* (2013.01); *G09G 2320/0285* (2013.01); *G09G 2320/041* (2013.01)

(58) Field of Classification Search
CPC ............. G09G 3/32; G09G 2310/0275; G09G 2310/0289; G09G 2310/08; G09G 2320/041; G09G 2300/0828; G09G 2320/0285
See application file for complete search history.

(56) References Cited

U.S. PATENT DOCUMENTS

2013/0321361 A1* 12/2013 Lynch .................... H10K 59/00 345/204
2014/0104259 A1* 4/2014 Oh ........................ G09G 3/3266 345/212
2017/0004765 A1* 1/2017 Tani ...................... G09G 3/3275
2018/0082631 A1* 3/2018 Chang .................. G09G 3/3648
(Continued)

FOREIGN PATENT DOCUMENTS

KR 1020170078921 A 7/2017
KR 1020180002099 A 1/2018
(Continued)

*Primary Examiner* — Doon Y Chow
(74) *Attorney, Agent, or Firm* — CANTOR COLBURN LLP

(57) ABSTRACT

A display device includes: a display panel including a data line, a sensing line, and a pixel electrically connected to the data line and the sensing line; a data driver including a sensing part, and for applying a data voltage to the data line, wherein the sensing part is for receiving a signal of the sensing line and to output sensing data; a temperature sensor sensing a current temperature; and a timing controller for selecting a correction lookup table for the current temperature from among correction lookup tables for temperatures, correcting an output deviation of the sensing part based on the correction lookup table for the current temperature, and compensating for input image data based on the sensing data.

15 Claims, 10 Drawing Sheets

(56) References Cited

U.S. PATENT DOCUMENTS

| | | | | |
|---|---|---|---|---|
| 2018/0090062 | A1* | 3/2018 | Nakamura | G09G 3/3233 |
| 2018/0174517 | A1* | 6/2018 | Lee | G09G 3/3233 |
| 2019/0027095 | A1* | 1/2019 | Kim | H10K 50/805 |
| 2021/0201733 | A1* | 7/2021 | Lee | G09G 3/3291 |
| 2021/0210000 | A1* | 7/2021 | Lee | G09G 3/32 |
| 2021/0335253 | A1* | 10/2021 | Yang | G09G 3/006 |
| 2022/0108650 | A1* | 4/2022 | Park | G09G 3/32 |
| 2022/0180815 | A1* | 6/2022 | Kim | G09G 3/3233 |
| 2022/0199025 | A1* | 6/2022 | Hong | G09G 3/3266 |
| 2023/0282176 | A1* | 9/2023 | Lin | G09G 3/344<br>345/208 |

FOREIGN PATENT DOCUMENTS

| | | | |
|---|---|---|---|
| KR | 101977942 | B1 | 5/2019 |
| KR | 1020200059957 | A | 5/2020 |

* cited by examiner

DISPLAY DEVICE AND METHOD OF COMPENSATING FOR AN IMAGE OF THE DISPLAY DEVICE

This application claims priority to Korean Patent Application No. 10-2022-0091515, filed on Jul. 25, 2022, and all the benefits accruing therefrom under 35 U.S.C. § 119, the content of which in its entirety is herein incorporated by reference.

BACKGROUND

1. Field

Embodiments of the present invention relate to a display device and a method of compensating for an image of the display device. More particularly, embodiments of the present invention relate to a display device sensing pixels and a method of compensating for an image of the display device.

2. Description of the Related Art

Generally, a display device may include a display panel, a timing controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

In the display device, differences in characteristics such as a threshold voltage and a mobility of a driving transistor and capacitance of a light emitting element may occur for each pixel due to process variation. Accordingly, compensation of the data voltage applied to the pixel (i.e., compensation of input image data) may be performed in order to increase display quality.

Accordingly, the display device may sense electrical characteristics of the driving transistor and/or the light emitting element to compensate for the input image data. However, there may be an output deviation between ICs or channels outputting sensing data for the electrical characteristics.

SUMMARY

Embodiments of the present invention provide a display device that corrects an output deviation of a sensing part outputting sensing data.

Embodiments of the present invention also provide a method of compensating for an image of the display device.

According to embodiments of the present invention, a display device includes: a display panel including a data line, a sensing line, and a pixel electrically connected to the data line and the sensing line; a data driver including a sensing part, and configured to apply a data voltage to the data line, where the sensing part is configured to receive a signal of the sensing line and to output sensing data; a temperature sensor configured to sense a current temperature; and a timing controller configured to select a correction lookup table for the current temperature from among correction lookup tables for temperatures, to correct an output deviation of the sensing part based on the correction lookup table for the current temperature, and to compensate for input image data based on the sensing data.

In an embodiment, each of the correction lookup tables for the temperatures may include a correction value according to the sensing data at each of the temperatures.

In an embodiment, the timing controller may be configured to correct the output deviation of the sensing part by adding the sensing data and the correction value of the correction lookup table for the current temperature.

In an embodiment, the timing controller may be configured to sense an electrical characteristic of the pixel by adding the sensing data and the correction value of the correction lookup table for the current temperature and to compensate for the input image data based on the electrical characteristic of the pixel.

In an embodiment, the correction value of each of the correction lookup tables for the temperatures may be determined by applying a constant voltage to the sensing part at each of the temperatures.

In an embodiment, the correction value of each of the correction lookup tables for the temperatures may be a value for correcting an output value of the sensing part according to the constant voltage at each of the temperatures to a preset reference output value according to the constant voltage at each of the temperatures.

In an embodiment, the timing controller may be configured to receive packet data including a packet for the sensing data and a packet for the current temperature from the data driver, and to separate the sensing data and the current temperature from the packet data.

In an embodiment, the timing controller may include a packet separator configured to separate the sensing data and the current temperature from the packet data, a level shifter configured to determine a table voltage according to the current temperature, a lookup table selector configured to select the correction lookup table for the current temperature according to the table voltage, and an image data compensator configured to compensate for the input image data based on the correction lookup table for the current temperature and the sensing data.

In an embodiment, the data driver may further include the temperature sensor.

In an embodiment, the sensing part may include an analog-to-digital converter configured to convert the signal of the sensing line in an analog form to output the sensing data in a quantized form.

According to embodiments of the present invention, a method of compensating for an image of a display device includes: determining correction lookup tables for temperatures; outputting sensing data based on a signal of a sensing line; sensing a current temperature; selecting a correction lookup table for the current temperature from among the correction lookup tables for the temperatures; correcting an output deviation of a sensing part outputting the sensing data based on the correction lookup table for the current temperature; and compensating for input image data based on the sensing data.

In an embodiment, each of the correction lookup tables for the temperatures may include a correction value according to the sensing data at each of the temperatures.

In an embodiment, the output deviation of the sensing part may be corrected by adding the sensing data and the correction value of the correction lookup table for the current temperature.

In an embodiment, compensating for the input image data may include sensing an electrical characteristic of a pixel in the display device by adding the sensing data and the correction value of the correction lookup table for the current temperature, and compensating for the input image data based on the electrical characteristic of the pixel.

In an embodiment, the correction value of each of the correction lookup tables for the temperatures may be determined by applying a constant voltage to the sensing part at each of the temperatures.

In an embodiment, determining the correction lookup tables may include applying the constant voltage to the sensing part, measuring an output value of the sensing part according to the constant voltage at each of the temperatures, determining the correction value for correcting the output value measured at each of the temperatures to a preset reference output value according to the constant voltage at each of the temperatures, and determining the correction lookup tables for the temperatures including the correction value.

In an embodiment, selecting the correction lookup table for the current temperature may include separating the sensing data and the current temperature from packet data including a packet for the sensing data and a packet for the current temperature, determining a table voltage according to the current temperature, and selecting the correction lookup table for the current temperature according to the table voltage.

In an embodiment, the current temperature may be a temperature of a data driver including the sensing part.

In an embodiment, the sensing part may include an analog-to-digital converter configured to convert the signal of the sensing line in an analog form to output the sensing data in a quantized form.

Therefore, the display device may use a different correction lookup table according to a current temperature by selecting a correction lookup table for the current temperature from among correction lookup tables for temperatures, and correcting an output deviation of the sensing part based on the correction lookup table for the current temperature. Accordingly, the display device may correct the output deviation of the sensing part according to the current temperature.

However, the effects of the present invention are not limited to the above-described effects, and may be variously expanded without departing from the spirit and scope of the present invention.

DETAILED DESCRIPTION

The terminology used herein is for the purpose of describing particular embodiments only and is not intended to be limiting. As used herein, “a”, “an,” “the,” and “at least one” do not denote a limitation of quantity, and are intended to include both the singular and plural, unless the context clearly indicates otherwise. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present invention will be explained in detail with reference to the accompanying drawings.

Figure 1:
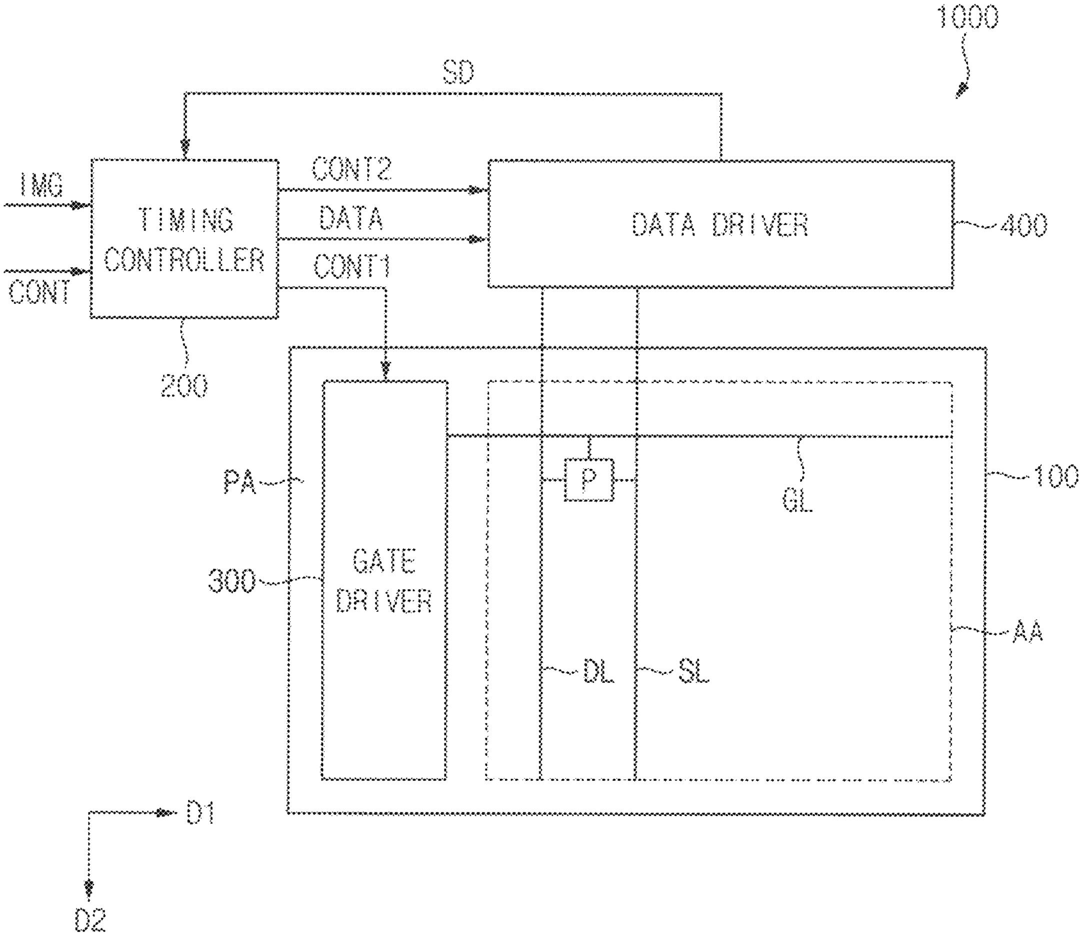
FIG. 1 is a block diagram illustrating a display device according to embodiments of the present invention.

FIG. 1 is a block diagram illustrating a display device 1000 according to embodiments of the present invention.

Referring to FIG. 1, the display device 1000 may include a display panel 100, a timing controller 200, a gate driver 300, and a data driver 400. In an embodiment, the timing controller 200 and the data driver 400 may be integrated into one chip.

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, a plurality of sensing lines SL, and a plurality of pixels P electrically connected to the data lines DL, the gate lines GL, and the sensing lines SL. The gate lines GL may extend in a first direction D1 and the data lines DL and the sensing lines SL may extend in a second direction D2 crossing the first direction D1.

The timing controller 200 may receive input image data IMG and an input control signal CONT from a host processor (e.g., a graphic processing unit; GPU). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the data driver 400.

The gate driver 300 may generate gate signals for driving the gate lines GL in response to the first control signal CONT1 input from the timing controller 200. For example, the gate signals may include a scan signal (SC in FIG. 2) and a sensing signal (SS in FIG. 2). The gate driver 300 may output gate signals to the gate lines GL. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltages to the data lines DL.

The data driver 400 may receive a signal of the sensing line SL and output sensing data SD. The timing controller 200 may sense electrical characteristics (e.g., a threshold voltage and a mobility of a driving transistor (DT in FIG. 2) of each of the pixels P, and a capacitance of a light emitting element (EE in FIG. 2), etc.) of the pixels P based on the sensing data SD. The timing controller 200 may compensate for the input image data IMG based on the sensing data SD.

Figure 2:
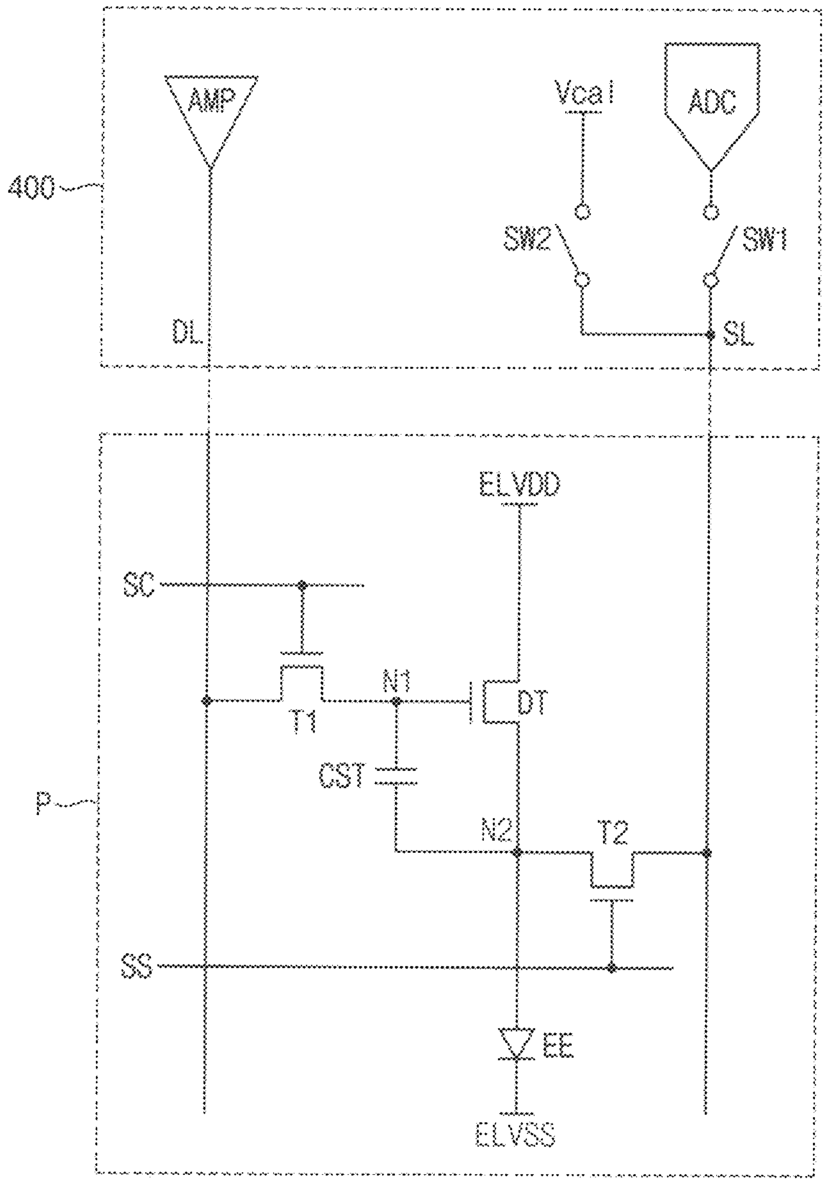
FIG. 2 is a circuit diagram illustrating an example of pixels and a data driver of the display device of FIG. 1.

FIG. 2 is a circuit diagram illustrating an example of the pixels P and the data driver 400 of the display device 1000 of FIG. 1.

Referring to FIGS. 1 and 2, the pixel P may include a driving transistor DT including a control electrode connected to a first node N1, a first electrode for receiving a first power voltage ELVDD (e.g., a high power voltage), and a second electrode connected to a second node N2, a first transistor T1 including a control electrode for receiving the scan signal SC, a first electrode for receiving the data voltage, and a second electrode connected to the first node N1, a second transistor T2 including a control electrode for receiving the sensing signal SS, a first electrode connected to the sensing line SL, and a second electrode connected to the second node N2, a storage capacitor CST including a first electrode connected to the first node N1 and a second electrode connected to the second node N2, and a light emitting element EE including a first electrode connected to the second node N2 and a second electrode for receiving a second power voltage ELVSS (e.g. a low power voltage).

Here, the second power voltage ELVSS may be smaller than the first power voltage ELVDD. For example, the light emitting element EE may be an organic light emitting diode.

In a sensing step, the first transistor T1 may apply a reference voltage to the first node N1 in response to the scan signal SC, and the second transistor T2 may apply an initialization voltage to the second node N2 in response to the sensing signal SS. At this time, a first switch SW1 may be turned off. The second transistor T2 may apply a signal of the second node N2 to the sensing line SL. At this time, the first switch SW1 may be turned on. The data driver 400 may receive a signal of the sensing line SL (i.e., the signal of the second node N2) and output the sensing data SD.

For example, the data driver 400 may include an analog-to-digital converter ADC that converts the signal of the sensing line SL in an analog form to output the sensing data SD in a quantized form.

The timing controller 200 may sense an electrical characteristic of the pixel P based on the sensing data SD. In an embodiment, the electrical characteristic of the pixel P may be an electrical characteristic of the driving transistor DT. For example, the electrical characteristic of the driving transistor DT may be the threshold voltage of the driving transistor DT. For example, the electrical characteristic of the driving transistor DT may be the mobility of the driving transistor DT. In an embodiment, the electrical characteristic of the pixel P may be electrical characteristic of the light emitting element EE. For example, the electrical characteristic of the light emitting element EE may be the capacitance of the light emitting element EE.

In a driving step, the second transistor T2 may apply the initialization voltage to the second node N2 in response to the sensing signal SS. At this time, the first switch SW1 may be turned off. Accordingly, the first electrode (i.e., an anode electrode) of the light emitting element EE may be initialized. The data driver 400 may apply the data voltage to the data line DL through an amplifier AMP. The first transistor T1 may apply the data voltage to the first node N1 in response to the scan signal SC. The data voltage applied to the first node N1 may be written to the storage capacitor CST. The driving transistor DT may generate a driving current corresponding to a voltage of the first node N1. The driving current may be applied to the light emitting element EE, and the light emitting element EE may emit light with a luminance according to the driving current.

A detailed description of a constant voltage Vcal and the second switch SW2 will be described later.

Figure 3:
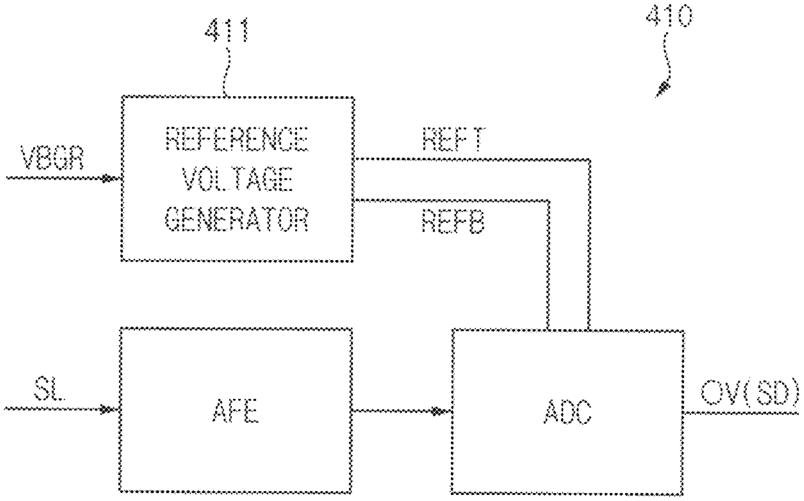
FIG. 3 is a block diagram illustrating an example of a data driver of the display device of FIG. 1.
Figure 4:
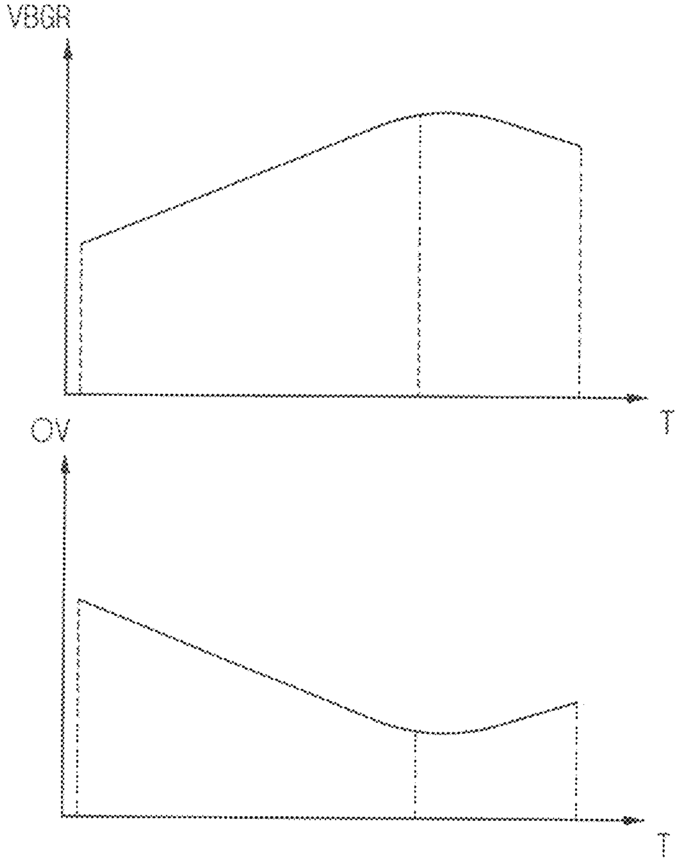
FIG. 4 is a graph illustrating an example of a bandgap reference voltage and an output value of a sensing part according to a temperature of the display device of FIG. 1.

FIG. 3 is a block diagram illustrating an example of the data driver 400 of the display device 1000 of FIG. 1, and FIG. 4 is a graph illustrating an example of a bandgap reference voltage VBGR and an output value OV of a sensing part 410 according to a temperature of the display device 1000 of FIG. 1.

Referring to FIGS. 1 to 3, the data driver 400 may include the sensing part 410 for receiving the signal of the sensing line SL and output the sensing data SD.

The sensing part 410 may include an analog front end AFE, an analog-to-digital converter ADC, and a reference voltage generator 411.

The analog front end AFE may provide the signal of the sensing line SL to the analog-to-digital converter ADC. For example, the analog front end AFE may include a capacitor, store the signal of the second node N2 of the pixel P in FIG. 2 in the capacitor, and provide the stored signal of the second node N2 to the analog-to-digital converter ADC.

The reference voltage generator 411 may provide a maximum reference voltage REFT and a minimum reference voltage REFB to the analog-to-digital converter ADC. The reference voltage generator 411 may generate the maximum reference voltage REFT and the minimum reference voltage REFB based on the bandgap reference voltage VBGR.

The analog-to-digital converter ADC may convert the signal of the sensing line SL in an analog form to output the sensing data SD in a quantized form. For example, the analog-to-digital converter ADC may divide a range between the maximum reference voltage REFT and the minimum reference voltage REFB into a plurality of ranges. For example, the analog-to-digital converter ADC may generate the sensing data SD corresponding to one range of the plurality of ranges to which the signal of the sensing line SL belongs.

The data driver 400 may include a plurality of readout chips. The readout chip may be an integrated circuit chip. Each of the readout chips may include a plurality of sensing parts 410. Also, a deviation of the output value OV may occur between the sensing parts 410 due to a process deviation or the like (i.e., an output deviation of the sensing part 410 occurs). That is, even when the same input value is applied to the sensing parts 410, the output values OV of the sensing parts 410 may be different from each other.

Here, the output value OV of the sensing part 410 may be a value output by the sensing part 410 with respect to the input value. For example, in the sensing step, the input value of the sensing part 410 may be the signal of the sensing line SL, and the output value OV may be the sensing data SD.

Referring to FIGS. 3 and 4, the bandgap reference voltage VBGR may be affected by the temperature T. Accordingly, the maximum reference voltage REFT and the minimum reference voltage REFB may vary, and the divided ranges may also vary. Accordingly, the output value OV of the sensing part 410 may vary. Also, the output value OV of the sensing part 410 may vary according to the temperature T even without an influence of the bandgap reference voltage VBGR. Accordingly, the output deviation of the sensing part 410 may vary according to the temperature T.

Accordingly, the timing controller 200 may include correction lookup tables (LUT in FIG. 5) for the temperatures T in order to differently correct the output deviation of the sensing part 410 according to the temperature. That is, the timing controller 200 may correct the output deviation of the sensing part 410 at each of the temperatures T using the corresponding lookup table of the correction lookup tables (LUT in FIG. 5).

Figure 5:
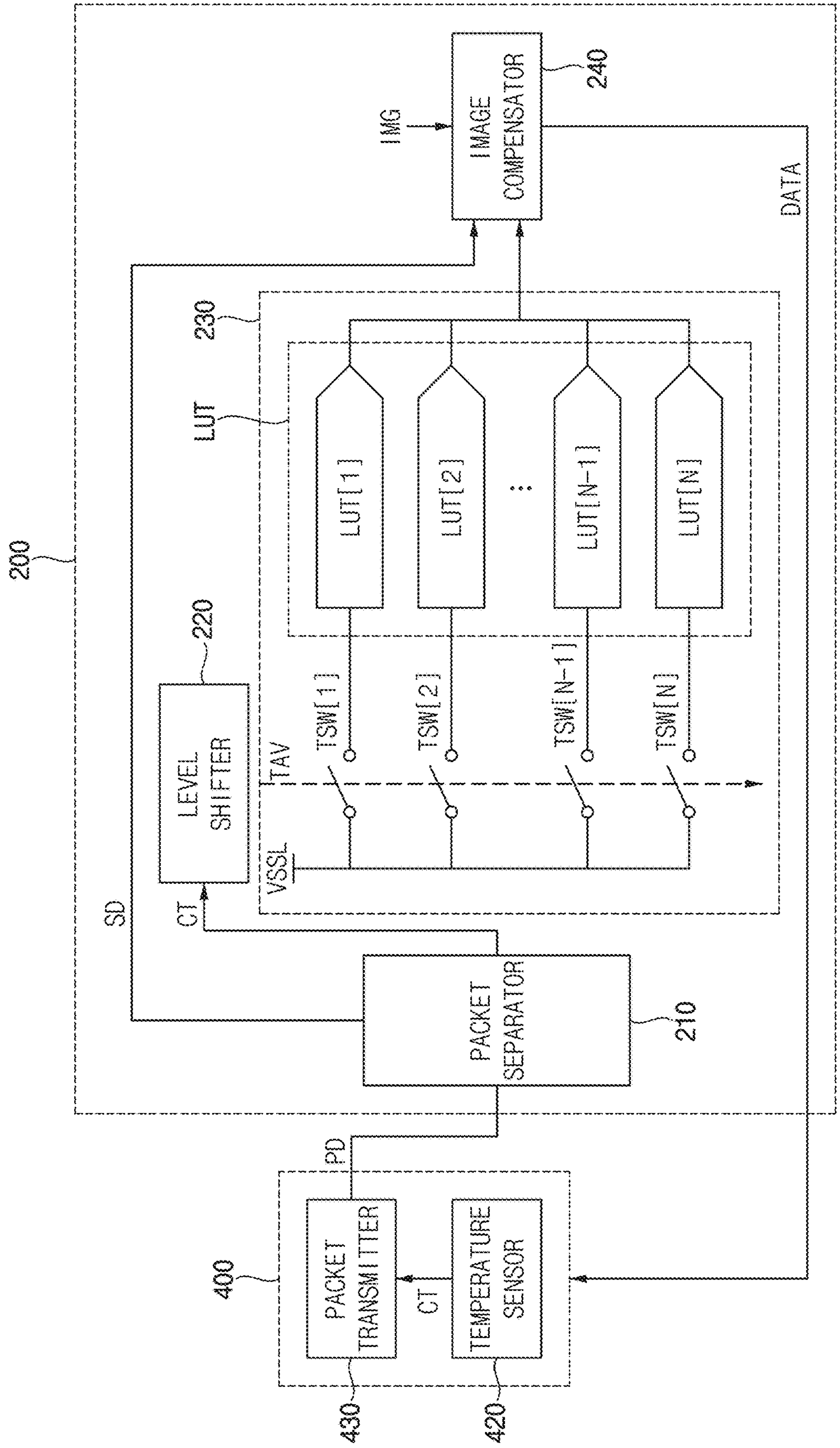
FIG. 5 is a diagram illustrating an example of a timing controller and a data driver of the display device of FIG. 1.
Figure 6:
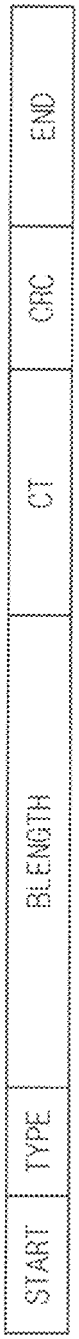
FIG. 6 is a diagram illustrating an example of packet data of the display device of FIG. 1.

FIG. 5 is a diagram illustrating an example of the timing controller 200 and the data driver 400 of the display device 1000 of FIG. 1, and FIG. 6 is a diagram illustrating an example of packet data PD of the display device 1000 of FIG. 1.

Referring to FIGS. 1, 3, 5, and 6, the timing controller 200 may select the correction lookup table LUT for the current temperature CT from among the correction lookup tables LUT for the temperatures T, correct the output deviation of the sensing part 410 based on the correction lookup table LUT for the current temperature CT, and compensate for the input image data IMG based on the sensing data SD.

The display device 1000 may include a temperature sensor 420 for sensing the current temperature CT. In an embodiment, the data driver 400 may include the temperature sensor 420. For example, the current temperature CT may be a temperature of the data driver 400 including the sensing part 410. However, embodiments of the present invention are not limited thereto. For example, the temperature sensor 420 may be included in the timing controller 200 in another embodiment. For another example, the temperature sensor 420 may be disposed separately from the data driver 400 and the timing controller 200.

The data driver 400 may include a packet transmitter 430. The packet transmitter 430 may apply the packet data PD including a packet for the sensing data SD and a packet for the current temperature CT to the timing controller 200.

Referring to FIG. 6, the packet data PD may include a start packet START, a type packet TYPE, a valid packet BLENGTH, a packet for the current temperature CT, an error packet CRC, and an end packet END. The start packet START may be a packet indicating a start of transmission. The type packet TYPE may be a packet indicating a type of data to be transmitted. The valid packet BLENGTH may include a packet for the sensing data SD. The error packet CRC may be a packet indicating whether an error occurs during data transmission. The end packet END may be a packet indicating an end of transmission.

The timing controller 200 may receive the packet data PD including the packet for the sensing data SD and the packet for the current temperature CT from the data driver 400, and separate the sensing data SD and the current temperature CT from the packet data PD.

The timing controller 200 may include a packet separator 210 for separating the sensing data SD and the current temperature CT from the packet data PD, a level shifter 220 for determining a table voltage TAV according to the current temperature CT, a lookup table selector 230 for selecting the correction lookup table LUT for the current temperature CT according to the table voltage TAV, and an image data compensator 240 for compensating for the input image data IMG based on the correction lookup table LUT and the sensing data SD.

The packet separator 210 may separate the sensing data SD and the current temperature CT from the packet data PD. The packet separator 210 may provide the current temperature CT to the level shifter 220.

The level shifter 220 may determine the table voltage TAV according to the current temperature CT. The lookup table selector 230 may select the correction lookup table LUT for the current temperature CT according to the table voltage TAV.

The lookup table selector 230 may include table switches TSW[1], TSW[2], . . . TSW[N−1], and TSW[N], where N is a positive integer, and the correction lookup tables LUT for the temperature. Each of the table switches TSW[1], TSW[2], . . . TSW[N−1], and TSW[N] may be connected to each of the correction lookup tables LUT for the temperatures. For example, a first table switch TSW[1] may be connected to a first correction lookup table LUT[1]. For example, a second table switch TSW[2] may be connected to a second correction lookup table LUT[2].

When a specific table switch TSW[1], TSW[2], . . . TSW[N−1], and TSW[N] is turned on, the correction lookup table LUT[1], LUT[2], . . . LUT[N−1], and LUT[N] connected to the specific table switch TSW[1], TSW[2], . . . TSW[N−1], and TSW[N] may be used. For example, when a specific table switch TSW[N] is turned on, a logic voltage VSSL may be applied to the correction lookup table LUT[N] connected to the specific table switch TSW[N].

The table switches TSW[1], TSW[2], . . . TSW[N−1], TSW[N] may be turned on in response to the table voltage TAV. Since the table voltage TAV is determined according to the current temperature CT, the correction lookup table LUT for the current temperature CT may be selected according to the current temperature CT.

In an embodiment, for example, when the current temperature CT is equal to or more than −20° C. and less than 0° C., the table voltage TAV may be 0.1V, and when the table voltage TAV is 0.1V, the first table switch TSW[1] may be turned on, and the first correction lookup table LUT[1] may be the correction lookup table LUT for a temperature of equal to or more than −20° C. and less than 0° C. For another example, when the current temperature CT is equal to or more than 0° C. and less than 20° C., the table voltage TAV may be 0.2V, and when the table voltage TAV is 0.2V, a second table switch TSW[2] may be turned on, and a second correction lookup table LUT[2] may be the correction lookup table LUT for a temperature of equal to or more than 0° C. and less than 20° C.

In another embodiment, for example, when the current temperature CT is −20° C., the table voltage TAV may be OV, and as the current temperature CT increases, the table voltage TAV may increase. And, when the current temperature CT is 0° C., the table voltage TAV may be 0.1V, and when the table voltage TAV is more than OV and less than or equal to 0.1V, the first table switch TSW[1] may be turned on, and the first correction lookup table LUT[1] may be the correction lookup table LUT for a temperature of more than −20° C. and less than or equal to 0° C. In addition, the table voltage TAV when the current temperature CT is 0° C. is 0.1V, the table voltage TAV when the current temperature CT is 20° C. may be when the table voltage TAV is more than 0.1V and less than or equal to 0.2V, the second table switch TSW[2] may be turned on, and the second correction lookup table LUT[2] may be the correction lookup table LUT for a temperature of more than 0° C. and less than or equal to 20° C.

Accordingly, the timing controller 200 may appropriately correct the output deviation of the sensing part 410 by using the correction lookup table LUT according to the temperature.

The image data compensator 240 may compensate for the input image data IMG based on the correction lookup table LUT and the sensing data SD. Each of the correction lookup tables LUT for the temperatures may include a correction value according to the sensing data SD at each of the temperatures.

In an embodiment, the timing controller 200 may correct the output deviation of the sensing part 410 by adding the sensing data SD and the correction value of the correction lookup table LUT for the current temperature CT. For example, the timing controller 200 may sense an electrical characteristic of the pixel P by adding the sensing data SD and the correction value of the correction lookup table LUT for the current temperature CT and compensate for the input image data IMG based on the electrical characteristic of the pixel P.

As described above, since the output deviation of the sensing part 410 is generated, the timing controller 200 may correct the output deviation of the sensing part 410 by adding the sensing data SD, which is the output value OV of the sensing part 410, and the correction value. The timing controller 200 may sense the electrical characteristic of the pixel P from the sensing data SD for which the output deviation is corrected.

The timing controller 200 may compensate for a difference in the electrical characteristic between the pixels P and generate the data signal DATA based on the compensated input image data.

Figure 7:
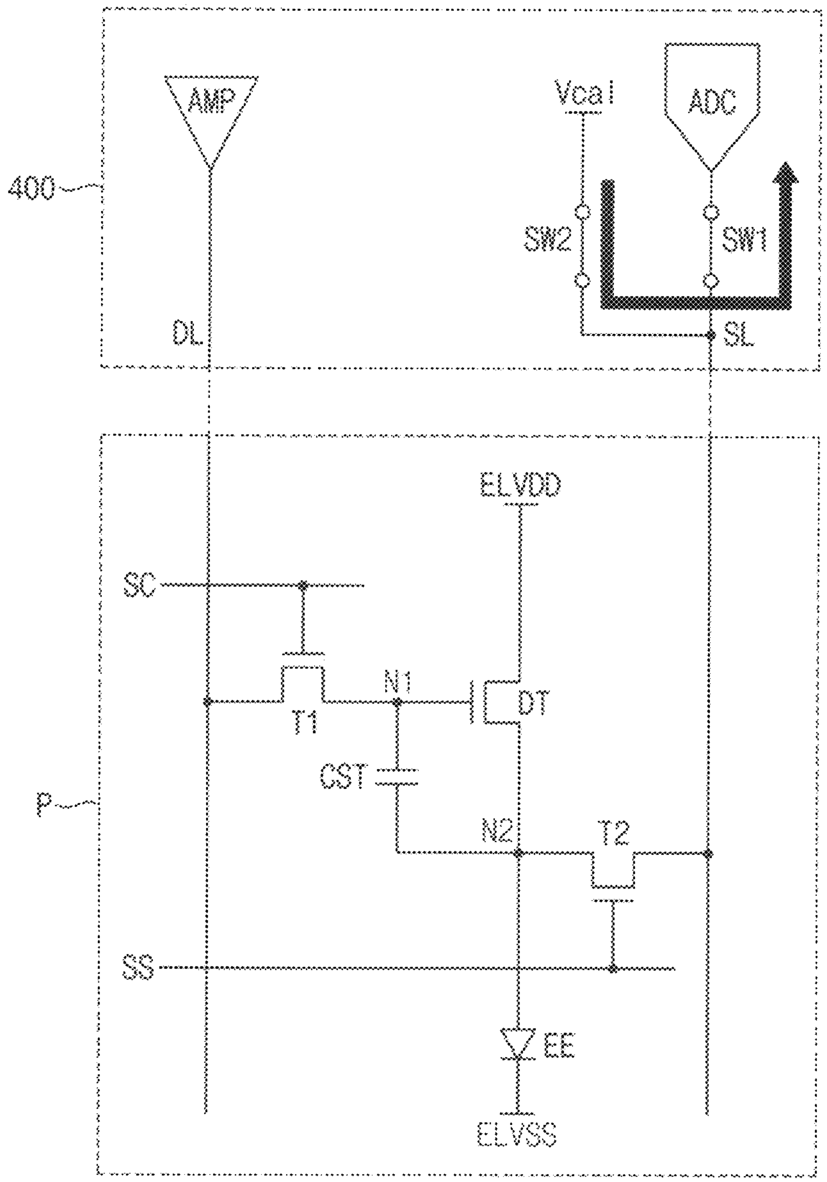
FIG. 7 is a circuit diagram illustrating an example in which the display device of FIG. 1 senses an output deviation of a sensing part.
Figure 8:
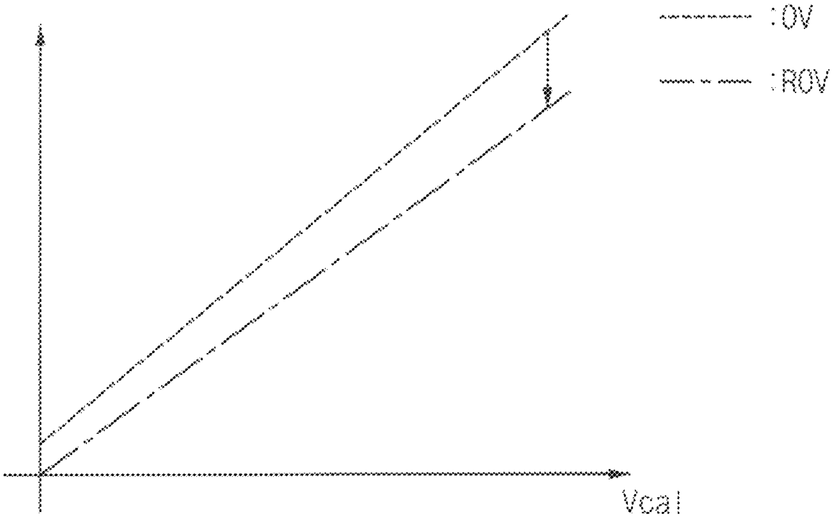
FIG. 8 is a graph illustrating an example in which the display device of FIG. 1 compensates for an output deviation of a sensing part.

FIG. 7 is a circuit diagram illustrating an example in which the display device 1000 of FIG. 1 senses the output deviation of the sensing part 410, and FIG. 8 is a graph illustrating an example in which the display device 1000 of FIG. 1 compensates for the output deviation of the sensing part 410.

Referring to FIGS. 3, 5, 7, and 8, the correction value of each of the correction lookup tables LUT for the temperatures may be determined by applying the constant voltage Vcal to the sensing part 410 at each of the temperatures. The correction value of each of the correction lookup tables LUT for the temperatures may be a value for correcting the output value OV of the sensing part 410 according to the constant voltage Vcal at each of the temperatures to a preset reference output value ROV according to the constant voltage Vcal at each of the temperatures.

The correction lookup tables LUT may be determined at a factory stage (i.e., before actual consumer use). For example, the correction values included in the correction lookup tables LUT may be determined using the output value OV of the sensing part 410 measured by applying the constant voltage Vcal to the sensing part 410 at the factory stage.

For example, as the second switch SW2 is turned on, various constant voltages Vcal may be applied to the sensing part 410 (i.e., the analog-to-digital converter ADC). Accordingly, the sensing part 410 may output the output values OV according to the constant voltages Vcal, and the output values OV may be measured. As described above, since the output deviation of the sensing part 410 occurs, the output values OV of the sensing parts 410 may be different for the same constant voltage Vcal. In this case, when the output values OV of all the sensing parts 410 are corrected to be the reference output value ROV, the output deviation of the sensing part 410 may be corrected.

Accordingly, to compensate for the output deviation, the correction value for correcting the output values OV of all the sensing parts 410 to be the reference output value ROV may be determined. For example, each of the sensing parts 410 may have a different correction value, and an output value corrected by the correction value (e.g., a sum of the output value and the correction value) may be the same as the reference output value ROV.

However, since the output deviation of the sensing part 410 varies depending on the temperature, the constant voltage Vcal may be applied to the sensing part 410 at each of the temperatures, and the correction value at each of the temperatures (i.e., the correction lookup table LUT for each of the temperatures) may be determined in the same manner.

Figure 9:
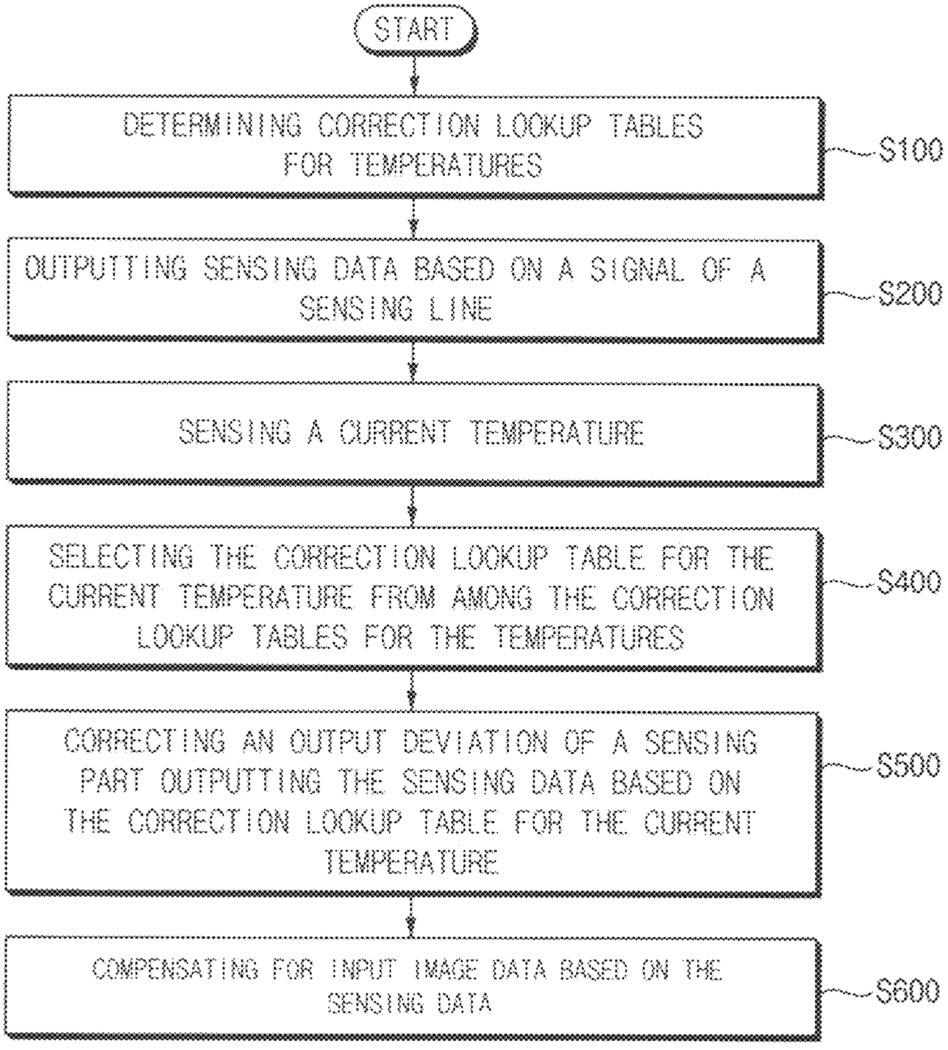
FIG. 9 is a flowchart illustrating a method of compensating for an image of a display device according to embodiments of the present invention.
Figure 10:
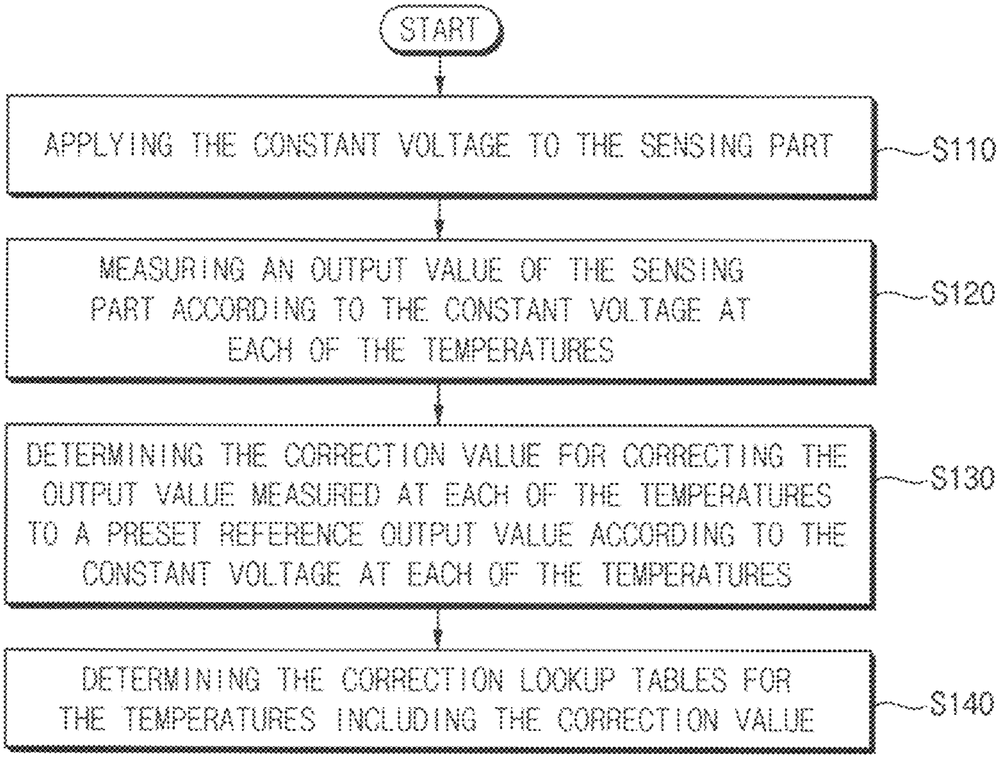
FIG. 10 is a flowchart illustrating an example of determining a correction lookup table according to the method of FIG. 9.

FIG. 9 is a flowchart illustrating a method of compensating for an image of a display device according to embodiments of the present invention, and FIG. 10 is a flowchart illustrating an example of determining a correction lookup table according to the method of FIG. 9.

Referring to FIGS. 9 and 10, the method of FIG. 9 may determine the correction lookup tables for the temperatures (S100), output the sensing data based on the signal of the sensing line (S200), sense the current temperature (S300), select the correction lookup table for the current temperature from among the correction lookup tables for the temperatures (S400), correct the output deviation of the sensing part outputting the sensing data based on the correction lookup table for the current temperature (S500), and compensate for the input image data based on the sensing data (S600).

Specifically, the method of FIG. 9 may determine the correction lookup tables for the temperatures (S100). The correction value of each of the correction lookup tables for the temperatures may be determined by applying the constant voltage to the sensing part at each of the temperatures. For example, as a detail of the S100 of the method of FIG. 9, the method of FIG. 10 may apply the constant voltage to the sensing part (S110), measure the output value of the sensing part according to the constant voltage at each of the temperatures (S120), determine the correction value for correcting the output value measured at each of the temperatures to the preset reference output value according to the constant voltage at each of the temperatures (S130), and determine the correction lookup tables for the temperatures including the correction value (S140).

Specifically, the method of FIG. 9 may output the sensing data based on the signal of the sensing line (S200). For example, the sensing part may include the analog-to-digital converter converting the signal of the sensing line in an analog form to output the sensing data in a quantized form.

Specifically, the method of FIG. 9 may sense the current temperature (S300). In an embodiment, the current temperature may be a temperature of the data driver including the sensing part. However, embodiments of the present invention are not limited thereto. For example, the current temperature may be a temperature of the timing controller in another embodiment. For another example, the current temperature may be a temperature of the display panel. For still another example, the current temperature may be an ambient temperature of the display panel.

Specifically, the method of FIG. 9 may select the correction lookup table for the current temperature from among the correction lookup tables for the temperatures (S400). For example, the method of FIG. 9 may separate the sensing data and the current temperature from the packet data including the packet for the sensing data and the packet for the current temperature, determine the table voltage according to the current temperature, and select the correction lookup table for the current temperature according to the table voltage.

Specifically, the method of FIG. 9 may correct the output deviation of the sensing part outputting the sensing data based on the correction lookup table for the current temperature (S500). Each of the correction lookup tables for the temperatures may include the correction value according to the sensing data at each of the temperatures. In an embodiment, the output deviation of the sensing part may be corrected by adding the sensing data and the correction value of the correction lookup table for the current temperature.

Specifically, the method of FIG. 9 may compensate for the input image data based on the sensing data (S600). The method of FIG. 9 may sense the electrical characteristic of the pixel by adding the sensing data and the correction value of the correction lookup table for the current temperature, and compensate for the input image data based on the electrical characteristic of the pixel.

Figure 11:
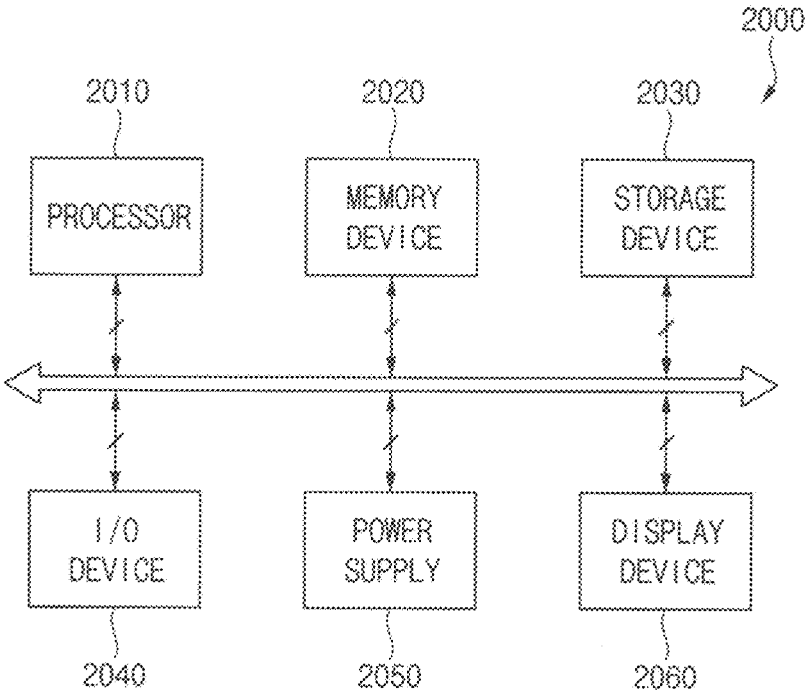
FIG. 11 is a block diagram showing an electronic device according to embodiments of the present invention.
Figure 12:
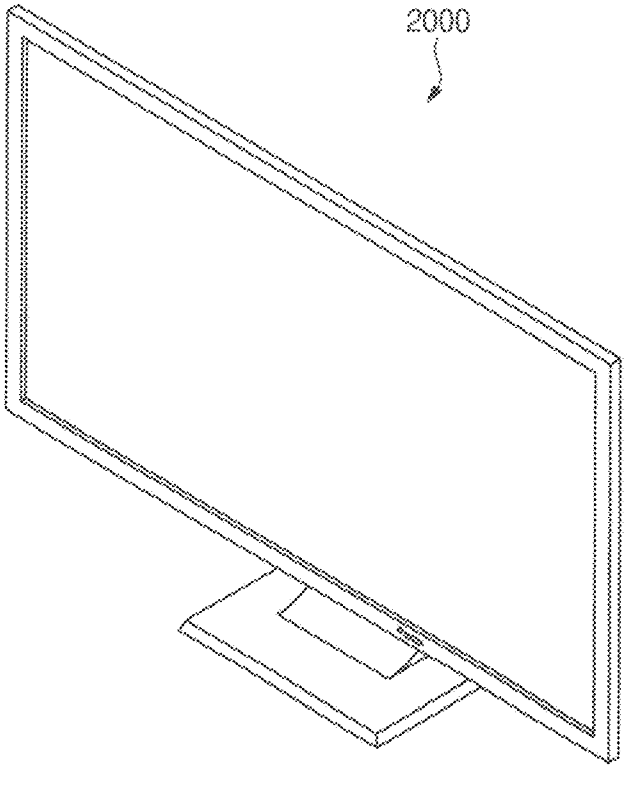
FIG. 12 is a diagram showing an example in which the electronic device of FIG. 11 is implemented as a television.

FIG. 11 is a block diagram showing an electronic device according to embodiments of the present invention, and FIG. 12 is a diagram showing an example in which the electronic device of FIG. 11 is implemented as a television.

Referring to FIGS. 11 and 12, the electronic device 2000 may include a processor 2010, a memory device 2020, a storage device 2030, an input/output ("I/O") device 2040, a power supply 2050, and a display device 2060. Here, the electronic device 2000 may be the display device 1000 of FIG. 1. In addition, the electronic device 2000 may further include a plurality of ports for communicating with a video card, a sound card, a memory card, a universal serial bus ("USB") device, other electronic devices, etc. In an embodiment, as shown in FIG. 12, the electronic device 2000 may be implemented as a television. However, the electronic device 2000 is not limited thereto. For example, the electronic device 2000 may be implemented as a cellular phone, a video phone, a smart pad, a smart watch, a tablet PC, a car navigation system, a computer monitor, a laptop, a head mounted display ("HMD") device, etc. in another embodiment.

The processor 2010 may perform various computing functions. The processor 2010 may be a microprocessor, a central processing unit ("CPU"), an application processor ("AP"), etc. The processor 2010 may be coupled to other components via an address bus, a control bus, a data bus, etc. Further, the processor 2010 may be coupled to an extended bus such as a peripheral component interconnection ("PCI") bus.

The memory device 2020 may store data for operations of the electronic device 2000. For example, the memory device 2020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc. and/or at least one volatile memory device such as a dynamic random access memory ("DRAM") device, a static random access memory ("SRAM") device, a mobile DRAM device, etc.

The storage device 2030 may include a solid state drive ("SSD") device, a hard disk drive ("HDD") device, a CD-ROM device, etc. In an embodiment, the correction lookup tables LUT may be stored in the memory device 2020 or the storage device 2030.

The I/O device 2040 may include an input device such as a keyboard, a keypad, a mouse device, a touch pad, a touch screen, etc., and an output device such as a printer, a speaker, etc. In some embodiments, the I/O device 2040 may include the display device 2060.

The power supply 2050 may provide power for operations of the electronic device 2000. For example, the power supply 2050 may be a power management integrated circuit ("PMIC").

The display device 2060 may display an image corresponding to visual information of the electronic device 2000. For example, the display device 2060 may be an organic light emitting display device or a quantum dot light emitting display device, but is not limited thereto. The packet transmitter 430, the packet separator 210, the level shifter 220, or the image compensator 240 may be implemented by the display device 2060, software, or firmware, for example, implemented in a form of an application-specific integrated circuit ("ASIC"). The display device 2060 may be coupled to other components via the buses or other communication links. Here, the display device 2060 may correct the output deviation of the sensing part according to the current temperature.

The inventions may be applied to any electronic device including the display device. For example, the inventions may be applied to a television ("TV"), a digital TV, a 3D TV, a mobile phone, a smart phone, a tablet computer, a virtual reality ("VR") device, a wearable electronic device, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display device comprising:

a display panel including a data line, a sensing line, and a pixel electrically connected to the data line and the sensing line;

a data driver including a sensing part and configured to apply a data voltage to the data line, wherein the sensing part is configured to receive a signal of the sensing line and to output sensing data;

a temperature sensor configured to sense a current temperature; and a timing controller configured to select a correction lookup table from a plurality of correction lookup tables based on the current temperature, to correct an output deviation of the sensing part based on the correction lookup table for the current temperature, and to compensate for input image data based on the sensing data, wherein each of the plurality of correction lookup tables corresponds to a range of temperatures and includes a correction value according to the sensing data at each of the temperatures, and wherein the correction value of each of the plurality of correction lookup tables for the temperatures is determined by applying a constant voltage to the sensing part at each of the temperatures.

2. The display device of claim 1, wherein the timing controller is configured to correct the output deviation of the sensing part by adding the sensing data and the correction value of the correction lookup table for the current temperature.

3. The display device of claim 2, wherein the timing controller is configured to sense an electrical characteristic of the pixel by adding the sensing data and the correction value of the correction lookup table for the current temperature and to compensate for the input image data based on the electrical characteristic of the pixel.

4. The display device of claim 1, wherein the correction value of each of the plurality of correction lookup tables for the temperatures is a value for correcting an output value of the sensing part according to the constant voltage at each of the temperatures to a preset reference output value according to the constant voltage at each of the temperatures.

5. The display device of claim 1, wherein the timing controller is configured to receive packet data including a packet for the sensing data and a packet for the current temperature from the data driver, and to separate the sensing data and the current temperature from the packet data.

6. The display device of claim 5, wherein the timing controller includes:

a packet separator configured to separate the sensing data and the current temperature from the packet data;

a level shifter configured to determine a table voltage according to the current temperature;

a lookup table selector configured to select the correction lookup table for the current temperature according to the table voltage; and an image data compensator configured to compensate for the input image data based on the correction lookup table for the current temperature and the sensing data.

7. The display device of claim 1, wherein the data driver further includes the temperature sensor.

8. The display device of claim 1, wherein the sensing part includes:

an analog-to-digital converter configured to convert the signal of the sensing line in an analog form to output the sensing data in a quantized form.

9. A method of compensating for an image of a display device comprising:

determining a plurality of correction lookup tables, wherein each of the plurality of correction lookup tables corresponds to a range of temperatures;

outputting sensing data based on a signal of a sensing line;

sensing a current temperature;

selecting a correction lookup table from the plurality of correction lookup tables based on the current temperature;

correcting an output deviation of a sensing part outputting the sensing data based on the correction lookup table for the current temperature; and compensating for input image data based on the sensing data, wherein the plurality of correction lookup tables includes a correction value according to the sensing data at each of the temperatures, and wherein the correction value of each of the plurality of correction lookup tables for the temperatures is determined by applying a constant voltage to the sensing part at each of the temperatures.

10. The method of claim 9, wherein the output deviation of the sensing part is corrected by adding the sensing data and the correction value of the correction lookup table for the current temperature.

11. The method of claim 10, wherein compensating for the input image data includes:

sensing an electrical characteristic of a pixel in the display device by adding the sensing data and the correction value of the correction lookup table for the current temperature; and compensating for the input image data based on the electrical characteristic of the pixel.

12. The method of claim 9, wherein determining the plurality of correction lookup tables includes:

applying the constant voltage to the sensing part;

measuring an output value of the sensing part according to the constant voltage at each of the temperatures;

determining the correction value for correcting the output value measured at each of the temperatures to a preset reference output value according to the constant voltage at each of the temperatures; and determining the plurality of correction lookup tables for the temperatures including the correction value.

13. The method of claim 9, wherein selecting the correction lookup table for the current temperature includes:

separating the sensing data and the current temperature from packet data including a packet for the sensing data and a packet for the current temperature;

determining a table voltage according to the current temperature; and selecting the correction lookup table for the current temperature according to the table voltage.

14. The method of claim 9, wherein the current temperature is a temperature of a data driver including the sensing part.

15. The method of claim 9, wherein the sensing part includes:

an analog-to-digital converter configured to convert the signal of the sensing line in an analog form to output the sensing data in a quantized form.

* * * * *